Nov. 18, 1952     E. J. FLAHERTY     2,618,411
CONDIMENT DISPENSER
Filed Dec. 29, 1949
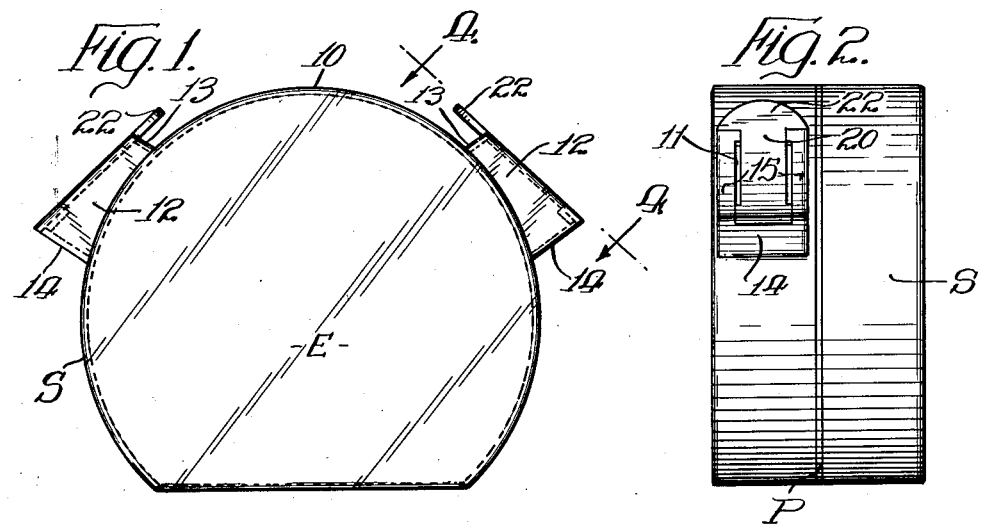
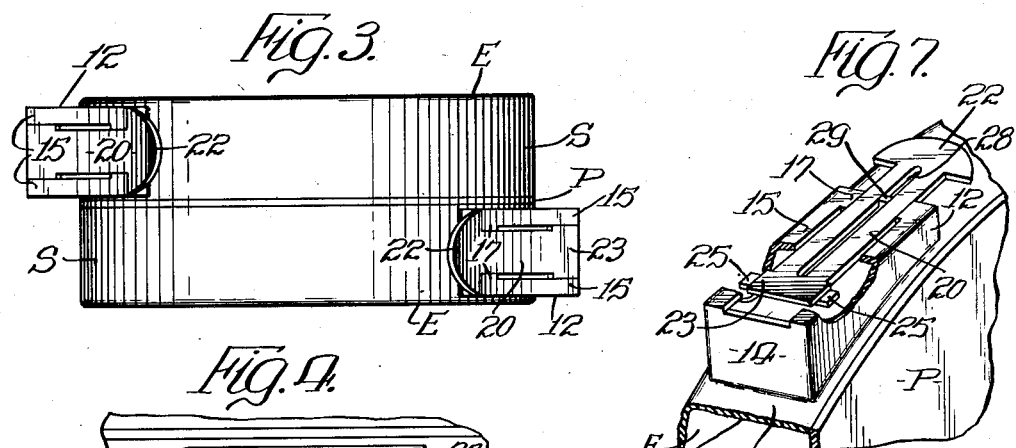
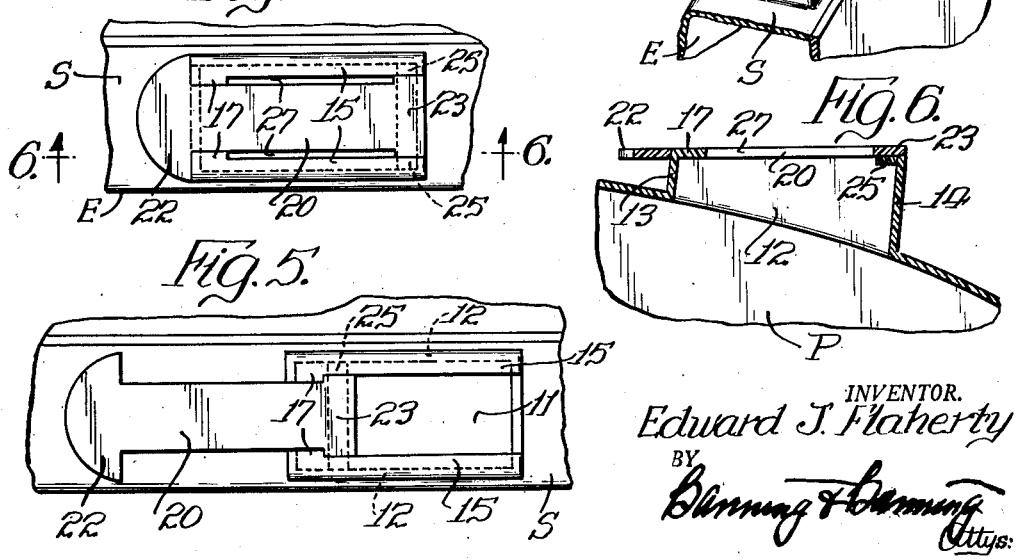
INVENTOR.
Edward J. Flaherty Patented Nov. 18, 1952

2,618,411

UNITED STATES PATENT OFFICE 2,618,411

CONDIMENT DISPENSER

Edward J. Flaherty, Muskogee, Okla.

Application December 29, 1949, Serial No. 135,658

5 Claims. (Cl. 222—148)

This invention relates generally to condiment dispensers and more particularly to a combination salt and pepper shaker.

As every user knows, salt, being a deliquescent material, is greatly affected by air temperatures and moisture content. This characteristic of salt often causes it to become damp and caked. The common type of salt shaker is inadequate under these conditions due to the fact that the salt clogs up the outlet perforations and will not run out when needed. This same trouble is often encountered with other non-liquid condiments but usually to a lesser degree. When this happens it is necessary to clean out the perforations before the shaker can again be used and this usually means disassembling the shaker, removing the offending salt and assembling the shaker again, all of which is very troublesome and must be repeated again and again.

The combination salt and pepper shaker of my invention overcomes the faults inherent in shakers heretofore known by providing a container body which when shaken imparts to the contents a rolling motion that to a great extent retards caking. The outlet openings through which the contents are dispensed are of such a shape that salt or the like readily passes therethrough even when damp and clustered. In addition, I have provided a novel means whereby such outlet openings may easily and quickly be cleared if, due to severe conditions, they do become stopped up.

One object of my invention is to provide a combination salt and pepper shaker which, when used, effectively retards caking of the contents.

Another object of my invention is to provide a combination salt and pepper shaker having outlet openings which do not readily become clogged up.

A further object of my invention is to provide a combination salt and pepper shaker having novel means whereby the outlet openings may be cleared quickly if they do become clogged.

Another object is to provide a combination salt and pepper shaker which may be refilled with a minimum of effort.

Other objects and advantages will become apparent from a consideration of the following detailed description taken in connection with the accompanying drawing wherein my invention is shown. However, it will be understood that the invention is not limited to the details disclosed but includes all such variations and modifications as fall within the spirit of the invention and the scope of the appended claims.

In the drawing:

Figure 1 is a side elevational view;

Fig. 2 is an end elevational view;

Fig. 3 is a top plan view;

Fig. 4 is a fragmentary detail in elevation, looking from line 4—4 of Fig. 1 and showing the cover in its closed position;

Fig. 5 which is a similar view shows the cover in its open position;

Fig. 6 is a detail in section, taken on line 6—6 of Fig. 4; and

Fig. 7 is a fragmentary detail in perspective, showing a modified form of one of the condiment covers in partly open position.

The combination salt and pepper shaker here described comprises a semi-circular body having flat ends E and arcuate sides S. The bottom face of the shaker constitutes a base therefor such that the container, when rested on a table or other horizontal surface, will occupy a predetermined position thereon. Such a body may be conveniently produced from a plastic material which is transparent to afford a view of the shaker contents. A partition P divides the body longitudinally into two separate compartments for the accommodation of such condiments as salt and pepper, for example. Near the top of one compartment, in a position about 60° off vertical, is an opening 11 matched by a like opening in the other compartment and positioned similarly but oppositely off vertical. Each opening is surrounded by two upwardly extended side walls 12, parallel to the body ends E, and two end walls 13 and 14 occupying upper and lower positions, respectively, the latter being somewhat longer. A flange 15 extends inwardly from the top edge of each side wall 12. These walls define a mouth through which salt or other commodity is moved into and out of the shaker. Each flange is widened at 17 near the upper end wall 13 so as to decrease the distance between the widened flanges 17.

Disposed lengthwise in the opening 11 between the flanges 15 is a cover 20 which is adapted for longitudinal sliding movement therebetween. The body of this cover is of a width to slidingly engage the two flanges at 17 where the distance separating them is the least, and it extends lengthwise from the lower end wall 14 to and beyond the upper end wall 13 where it terminates in a widened head 22. Near the lower end portion 23 of the cover body is a cross bar extended laterally for a slight distance beyond opposite sides of the cover to provide a pair of guide feet 25 which slidingly engage the under surfaces of the flanges 15 where the distance between them is the greatest. From this it can be seen that the cover 20 engages the flanges 15, leaving longitudinal slots 27 (see Fig. 4) between the sides of the cover 20 and the flanges 15 intermediately of the cover ends. In the modified form shown in Fig. 7 an elongated slot 28 extends lengthwise within the confines of the cover 20 and straddles a lug 29 upstanding from the end wall 13. These slots 27 (and 28 of the modified form) constitute the outlet openings through which the salt or other condiment is discharged. When in closed position, the lower end portion 23 of of the cover is rested on the top of the end wall 14.

In use the shaker is tilted so that the slots 27 (and 28 in the modified form) are pointed downwardly, and when shaken the contents will be discharged just as from an ordinary salt shaker. The act of shaking imparts a peculiar rolling motion to the shaker contents, due to the arcuate sides of the container, and this motion tends to stir up and prevent grains of salt from adhering to each other. When the salt shaker is used, the contents of both the salt container and the pepper container are stirred up, and any grains of pepper which might have adhered to the outlet openings of the container therefor tend to dislodge themselves and fall down into the container. When the pepper shaker is being used the converse is true. Because the cover is maintained with its foot end down, gravity also will serve to keep it closed as shown in Fig. 4. Here the head 22 engages with the flanges 15 at their upper ends to provide a stop which limits the cover in its downward sliding movements.

I have discovered that the elongated slots 27 (and 28 of the modified form) have a lesser tendency to become clogged up than the usual type of perforations found in most shakers, but in the event that they do become clogged up, as from excessively damp salt, it is merely necessary to open and close the cover to effect an immediate remedy. When the cover is slid open, the lower end portion 23 slides along the flanges until stopped by engagement with the widened part 17 of the flanges near the upper end wall 13, as shown in Fig. 5. In so doing the feet 25 clear any clogged salt away from the edges of the flanges 15, and the guide feet 25 likewise clear the under side of the flanges; and as the cover progresses toward its fully opened position (Fig. 5) the widened part 17 of the flanges 15 clears all adhering salt from the feet 23 of the cover 20. Simultaneously in the form shown in Fig. 7 the lug 29 removes congested matter from the slot 28. When the cover is slid back to its normal closed position, as shown in Fig. 4, the slots 27 (and 28 of the modified form) and the under side of the flanges will be completely free of all congested matter and the shaker is ready for use.

To refill either container it is merely necessary to slide the cover to the open position and pour the condiment in through the unobstructed opening.

The present embodiment is to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A condiment container having an opening bordered by walls defining a rectangular mouth, a pair of flanges extending inwardly from the two long walls at their tops, a cover mounted to slide lengthwise of the mouth between the flanges but in spaced relation to at least one thereof whereby to provide therebetween a continuously extending narrow slot of sufficient width to freely allow the pouring of salt and pepper therethrough constituting a discharge opening for loose material within the container, interengaging means on the cover and mouth to limit the range of sliding movements of the cover, and means carried by the cover near one end thereof for movement therewith through substantially the full length of the slot and extending thereinto for dislodging therefrom accumulated matter therewithin.

2. In a condiment container wherein is an upwardly facing opening defining a rectangular mouth and a cover therefor slidable lengthwise thereof between a fully closed position and an opposite position wherein the mouth is substantially fully open, the feature of improvement which consists in forming through the cover a longitudinal slot extending continuously between points relatively close to opposite ends thereof and affording an opening for loose material to flow outwardly from the interior of the container when the cover is in closed position, and a lug upstanding from the container mouth at one end thereof and positioned within the cover slot in engaging relation therewith for dislodging accumulated material from the slot when the cover is slid in either direction lengthwise of the container mouth.

3. A condiment container having a base arranged to rest on a horizontal surface and provided with an upwardly facing opening bordered by walls defining a rectangular mouth, a pair of flanges extending inwardly from the two long walls at their tops, an elongated cover through which is formed a slot extending lengthwise of the cover, a lug projecting upwardly into the cover slot from one end wall of the mouth, the cover being mounted to slide lengthwise of the mouth between its inwardly extended flanges, from a closed position over the mouth toward and beyond the upper end thereof to an open position relative thereto, with the lug remaining continuously in the cover slot at varying positions between the ends thereof for dislodging from the slot accumulated matter therewithin, and interengaging means on the cover and mouth to limit the range of sliding movements of the cover.

4. A condiment container having a base arranged to rest on a horizontal surface and provided with an upwardly facing opening defining a rectangular mouth, a cover arranged over the mouth for sliding movement lengthwise thereof between open and closed positions with respect thereto, the cover being provided with an elongated continuous discharge slot in communication with the interior of the container, interengaging means on the cover and mouth for confining the cover movements to a straight line, and a lug adjacent one end of the mouth and projecting into the cover discharge slot to be straddled by adjacent portions of the cover with capacity to dislodge material accumulated within said slot when the cover is slid between its open and closed positions.

5. A condiment container having an upwardly facing opening bordered by walls defining a rectangular mouth, a pair of flanges extending inwardly from the two long walls adjacent their upper edges, a cover dimensioned to fit closely between the flanges, flush therewith, and mounted to slide lengthwise of the mouth between the flanges from a closed position thereover toward and beyond one end thereof to an open position relative thereto, the cover being formed therethrough with an elongated slot extending lengthwise of the cover and in communication with the interior of the container, a lug positioned on one end wall of the mouth and extending upwardly therefrom to engage the cover slot and, with each sliding movement of the cover, to dislodge from its slot accumulated matter therewithin, and means extending laterally from the cover in sliding engagement with the inner faces of each of the flanges to hold the cover against separation therefrom.

EDWARD J. FLAHERTY.

REFERENCES CITED

The following references are of record in the file of this patent:

UNITED STATES PATENTS

| Number | Name | Date |
| --- | --- | --- |
| 1,610,759 | Downing | Dec. 14, 1926 |
| 1,799,584 | Eltag | Apr. 7, 1931 |
| 1,847,703 | Ullman | Mar. 1, 1932 |
| 1,924,999 | Mills | Aug. 29, 1933 |
| 2,037,746 | Wardell | Apr. 21, 1936 |
| 2,532,690 | Zimmerman | Dec. 5, 1950 |